US007925859B2

(12) United States Patent
Banerjee et al.

(10) Patent No.: US 7,925,859 B2
(45) Date of Patent: *Apr. 12, 2011

(54) THREE-TIERED TRANSLATION LOOKASIDE BUFFER HIERARCHY IN A MULTITHREADING MICROPROCESSOR

(75) Inventors: Soumya Banerjee, San Jose, CA (US); Michael Gottlieb Jensen, Sunnyvale, CA (US); Ryan C. Kinter, Sammamish, WA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,375

(22) Filed: Jun. 30, 2009

(65) Prior Publication Data

US 2009/0327649 A1 Dec. 31, 2009

Related U.S. Application Data

(63) Continuation of application No. 11/075,041, filed on Mar. 8, 2005, now Pat. No. 7,558,939.

(51) Int. Cl.
*G06F 12/00* (2006.01)

(52) U.S. Cl. ........ 711/205; 711/206; 711/207; 711/122; 711/E12.016; 711/E12.061; 711/136

(58) Field of Classification Search ........................ None
See application file for complete search history.

(56) References Cited

U.S. PATENT DOCUMENTS

| | | | |
|---|---|---|---|
| 4,953,073 | A | 8/1990 | Moussouris et al. |
| 5,070,502 | A | 12/1991 | Supnik |
| 5,226,133 | A | 7/1993 | Taylor et al. |
| 5,237,671 | A | 8/1993 | Freitas et al. |
| 5,263,140 | A | 11/1993 | Riordan |
| 5,325,507 | A | 6/1994 | Freitas et al. |
| 5,526,504 | A | 6/1996 | Hsu et al. |
| 5,574,877 | A | 11/1996 | Dixit et al. |
| 5,619,672 | A | 4/1997 | Sutu et al. |
| 6,266,755 | B1 | 7/2001 | Yeager |
| 6,523,104 | B2 | 2/2003 | Kissell |
| 6,643,759 | B2 | 11/2003 | Andersson et al. |
| 6,651,156 | B1 | 11/2003 | Courtright et al. |
| 6,728,859 | B1 | 4/2004 | Kissell |
| 2004/0060040 | A1 | 3/2004 | Collard |
| 2004/0143720 | A1 | 7/2004 | Mansell et al. |
| 2004/0226011 | A1 | 11/2004 | Augsburg et al. |
| 2006/0206686 | A1 | 9/2006 | Banerjee et al. |

*Primary Examiner* — Reginald G Bragdon
*Assistant Examiner* — Thanh D Vo
(74) *Attorney, Agent, or Firm* — Sterne, Kessler, Goldstein & Fox PLLC

(57) ABSTRACT

A three-tiered TLB architecture in a multithreading processor that concurrently executes multiple instruction threads is provided. A macro-TLB caches address translation information for memory pages for all the threads. A micro-TLB caches the translation information for a subset of the memory pages cached in the macro-TLB. A respective nano-TLB for each of the threads caches translation information only for the respective thread. The nano-TLBs also include replacement information to indicate which entries in the nano-TLB/micro-TLB hold recently used translation information for the respective thread. Based on the replacement information, recently used information is copied to the nano-TLB if evicted from the micro-TLB.

25 Claims, 5 Drawing Sheets

Instruction Fetcher with 3-Tiered TLB

Three-Tiered-TLB Operation

THREE-TIERED TRANSLATION LOOKASIDE BUFFER HIERARCHY IN A MULTITHREADING MICROPROCESSOR

CROSS REFERENCE TO RELATED APPLICATION(S)

This application is continuation of Application 11/075,041, filed Mar. 8, 2005, now U.S. Pat. No. 7,558,939, which is hereby incorporated by reference herein in its entirety.

FIELD OF THE INVENTION

The present invention relates in general to the field of virtual memory systems using translation lookaside buffers, and particularly to using translation lookaside buffers in multithreading processors.

BACKGROUND OF THE INVENTION

Translation Lookaside Buffers (TLBs)

Many modern microprocessors support the notion of virtual memory. In a virtual memory system, instructions of a program executing on the microprocessor refer to data using virtual addresses in a virtual address space of the microprocessor. Additionally, the instructions themselves are referred to using virtual addresses in the virtual address space. The virtual address space may be much larger than the actual physical memory space of the system, and in particular, the amount of virtual memory is typically much greater than the amount of physical memory present in the system. The virtual addresses generated by the microprocessor are translated into physical addresses that are used to access system memory or other devices, such as I/O devices. Typically, the physical addresses are also used to access instruction and data caches of the processor.

A common virtual memory scheme supported by microprocessors is a paged memory system. A paged memory system employs a paging mechanism for translating, or mapping, virtual addresses to physical addresses. The physical address space is divided up into physical pages of fixed size. A common page size is 4 KB. The virtual addresses comprise a virtual page address portion and a page offset portion. The virtual page address specifies a virtual page in the virtual address space. The virtual page address is translated by the paging mechanism into a physical page address. The page offset specifies a physical offset in the physical page, i.e., a physical offset from the physical page address.

The advantages of memory paging are well known. One example of a benefit of memory paging systems is that they enable programs to execute with a larger virtual memory space than the existing physical memory space. Another benefit is that memory paging facilitates relocation of programs in different physical memory locations during different or multiple executions of the program. Another benefit of memory paging is that it allows multiple processes to execute on the processor simultaneously, each having its own allocated physical memory pages to access without having to be swapped in from disk, and without having to dedicate the full physical memory to one process. Another benefit is that memory paging facilitates memory protection from other processes on a page basis.

Page translation, i.e., translation of the virtual page address to the physical page address, is accomplished by what is commonly referred to as a page table walk. Typically, the operating system maintains page tables that contain information for translating the virtual page address to a physical page address. Typically, the page tables reside in system memory. Hence, it is a relatively costly operation to perform a page table walk, since multiple memory accesses must typically be performed to do the translation. The page table walk may be performed by hardware, software, or a combination thereof.

To improve performance by reducing the number of page table walks, many microprocessors provide a mechanism for caching page table information, which includes physical page addresses translated from recently used virtual page addresses. The page table information cache is commonly referred to as a translation lookaside buffer (TLB). The virtual page address is provided to the TLB, and the TLB performs a lookup of the virtual page address. If the virtual page address hits in the TLB, then the TLB provides the corresponding translated physical page address, thereby avoiding the need to perform a page table walk to translate the virtual page address to the physical page address.

In a processor having an instruction cache that is addressed by a physical address, the virtual address of the cache line containing the next instruction to fetch must be translated into a physical address before the instruction cache line can be fetched. In order to efficiently make use of the execution units of the processor, the execution units must be constantly supplied with instructions to execute, or else pipeline bubbles will occur in which the execution units are sitting idle with no valid instructions to execute. This implies that the instruction fetch portion of the processor must fetch instructions at a high enough rate to keep the execution units supplied with instructions. This further implies that the TLB for the instruction cache must provide a high hit rate to enable the instruction cache to supply instructions at a high rate.

Multithreading

Microprocessor designers employ many techniques to increase processor performance. Most microprocessors operate using a clock signal running at a fixed frequency. Each clock cycle the circuits of the microprocessor perform their respective functions. According to Hennessy and Patterson, the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the instructions per clock cycle, as well as the clock frequency of microprocessors is pipelining, which overlaps execution of multiple instructions within pipeline stages of the microprocessor. In an ideal situation, each clock cycle one instruction moves down the pipeline to a new stage, which performs a different function on the instructions. Thus, although each individual instruction takes multiple clock cycles to complete, because the multiple cycles of the individual instructions overlap, the average clocks per instruction is reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a branch misprediction and concomitant pipeline flush, or due to a data dependence, or due to a long latency instruction such as a divide instruction, floating-point instruction, or the like. Again, the ability of a multithreaded microprocessor to issue instructions from other threads to pipeline stages that would otherwise be idle may significantly reduce the time required to execute the program or collection of programs comprising the threads.

As may be observed from the foregoing, a processor concurrently executing multiple threads may reduce the time required to execute a program or collection of programs comprising the multiple threads. However, concurrently fetching instructions from multiple threads introduces problems with respect to the instruction TLB that may make it difficult for the instruction fetch portion of the processor to supply the execution units of the processor with instructions of the threads at a high enough rate to keep the execution units busy, thereby diminishing the multithreading performance gains.

TLB Access Times

As illustrated above, it is important for the instruction TLB to provide a high hit rate to enable the instruction cache to supply instructions at a high rate to the execution units. TLB hit rate is partly a function of TLB size; the greater the number of pages for which the TLB caches translation information, the higher the hit rate, all other things being equal. However, the larger the TLB, the longer the TLB access time. It is desirable to have a fast TLB that requires only a single processor clock cycle, or fraction of a clock cycle, since the physical address is needed to fetch from the instruction cache. However, as processor clock speeds have increased, it has become increasingly difficult to design a fast TLB large enough to provide the desired hit rates. Consequently, processor designers have employed a two-tier TLB architecture that includes a micro-TLB. The micro-TLB is a fast TLB that caches page translation information for a subset of the pages whose information is cached in the larger TLB; consequently, the micro-TLB has a lower hit rate than the larger TLB. The large TLB backs up the micro-TLB such that if the micro-TLB misses, the larger TLB —since it has a higher hit rate— likely provides the physical page address information missing in the micro-TLB. However, the larger TLB supplies the information more slowly than the micro-TLB, in some cases multiple clock cycles later.

Because the micro-TLB stores translation information for a relatively small number of pages, in certain situations the hit rate of the micro-TLB may be quite low. For example, assume a four-entry micro-TLB, and assume a program executing on the processor that fetches instructions from five different virtual pages in rapid succession in a cyclical manner. In this situation, the micro-TLB will be thrashed as follows. Assume the translation information for the first four pages is cached in the micro-TLB. When an instruction from the fifth page is fetched, the virtual address of the fifth page will miss in the micro-TLB, and the micro-TLB entry for the first page will be evicted and replaced with the fifth page information obtained from the larger TLB multiple cycles later. An instruction from the first page will be fetched, and its virtual page address will miss in the micro-TLB because it was just evicted by the fifth page, and the micro-TLB entry for the second page will be evicted and replaced with the first page information obtained from the larger TLB multiple cycles later. An instruction from the second page will be fetched, and its virtual page address will miss in the micro-TLB because it was just evicted by the first page, and the micro-TLB entry for the third page will be evicted and replaced with the second page information obtained from the larger TLB multiple cycles later. This process may go on for a while, which essentially reduces the hit rate of the micro-TLB to zero and increases the effective access time of the two-tiered TLB system to the access time of the larger TLB.

Although the example just given effectively illustrates a program that could thrash a micro-TLB to cause the effective access time of the two-tiered TLB system to approach the access time of the larger TLB, the example is very unlikely to happen, and if it does, at least the program will execute, albeit slower than hoped. Nevertheless, the greater the number of disparate pages from which the program fetches instructions, and the closer together in time the disparate pages are accessed, the more the effective access time of the two-tiered TLB system approaches the access time of the larger TLB.

Multithreading Processors and TLBs

In many applications, the various threads being concurrently fetched by a multithreading processor are likely being fetched from disparate pages, and are likely being fetched close together in time. Consequently in these applications, the TLB thrashing example given above is more likely to be the rule, rather than the exception, in a multithreading processor concurrently fetching more threads than the number of pages for which the micro-TLB is caching translation information. If some of the threads are fetching between two (or more) pages close together in time, the likelihood of thrashing increases even more. As the effective access time of the TLB system approaches the access time of the larger TLB, the instruction fetch pipeline may not be able to fetch enough instructions to keep the execution units supplied with instructions, thereby potentially offsetting the gains in execution pipeline efficiency hoped for by employing multithreading.

Even worse, a pathological case may occur in which one or more of the threads is essentially starved from fetching any instructions, and therefore can make no forward progress. Assume the four-entry micro-TLB above and instructions from eight threads being concurrently fetched from eight distinct virtual memory pages in a cyclical manner. Assume the translation information for the first four threads is cached in the micro-TLB. When an instruction from the fifth thread is fetched, the virtual address of the fifth thread will miss in the micro-TLB, and the micro-TLB entry for the first thread will be evicted and replaced with the fifth thread information obtained from the larger TLB. However, because the processor has other threads for which it could be fetching while the larger TLB is being accessed, it will access the micro-TLB for the sixth thread, and the virtual address of the sixth thread will miss in the micro-TLB, and the micro-TLB entry for the second thread will be evicted and replaced with the sixth thread information obtained from the larger TLB. The processor will next access the micro-TLB for the seventh thread, and the virtual address of the seventh thread will miss in the micro-TLB, and the micro-TLB entry for the third thread will be evicted and replaced with the seventh thread information obtained from the larger TLB. The processor will next access the micro-TLB for the eighth thread, and the virtual address of the eighth thread will miss in the micro-TLB, and the micro-TLB entry for the fourth thread will be evicted and replaced with the eighth thread information obtained from the larger TLB. The processor will next access the micro-TLB for the first thread, and the virtual address of the first thread will miss in the micro-TLB, and the micro-TLB entry for the fifth thread will be evicted and replaced with the first thread information obtained from the larger TLB. This process will continue for four more cycles until the processor accesses the micro-TLB for the fifth thread and the virtual address of the fifth thread will miss in the micro-TLB, even though it was placed into the micro-TLB earlier in response to its miss in the micro-TLB. Consequently, the fifth thread can make no forward progress. In fact, in the scenario just described, no thread will make forward progress.

Therefore, what is needed is a TLB architecture with a high hit rate for a multithreading processor without a significantly increased aggregate access time.

BRIEF SUMMARY OF INVENTION

The present invention provides a three-tiered TLB system that includes a nano-TLB for each thread in addition to the micro-TLB and larger TLB. The last used page translation information for each thread is guaranteed to be cached in either the nano-TLB or micro-TLB. This insures that each thread is at least guaranteed to make forward progress, thereby eliminating the pathological case where a thread perpetually misses in the micro-TLB. Furthermore, in the case of well-behaved threads that fetch from a single page for a relatively long period, the aggregate access time for all threads approaches the access time of the nano-TLBs, which is a single cycle or less in most embodiments. Still further, in one embodiment, the behavior of the TLB system when the processor is executing a single thread is essentially the same as a non-multithreaded processor. Additionally, in the case where a small number of threads (where small approaches the number of micro-TLB entries) fetch from two pages in a short period, the aggregate access time for all threads approaches the access time of the micro-TLB, which is also a single cycle or less in most embodiments. Finally, the TLB system scales well with the number of concurrent threads supported by the processor.

In one aspect, the present invention provides a three-tiered translation lookaside buffer (TLB) apparatus in a multithreading microprocessor that concurrently fetches and executes instructions of a plurality of threads, for providing virtual-to-physical address translation information for a memory page in response to an instruction cache virtual fetch address for one of the plurality of threads. The apparatus includes a third-level TLB that caches virtual-to-physical address translation information for a plurality of memory pages for the plurality of threads. The apparatus also includes a second-level TLB, coupled to the third-level TLB, which has a plurality of entries for caching the information for a subset of the plurality of memory pages cached in the third-level TLB. The apparatus also includes a first-level TLB for each of a respective one of the plurality of threads. Each of the first-level TLBs has at least one entry for caching address translation information only for the respective one of the plurality of threads.

In another aspect, the present invention provides a method for translating an instruction cache virtual fetch address to a physical address in a multithreading microprocessor that concurrently fetches and executes instructions of a plurality of threads. The method includes caching virtual-to-physical address translation information in a three-tiered translation lookaside buffer (TLB) system. The system includes a macro-TLB that caches virtual-to-physical address translation information for all of the plurality of threads, a micro-TLB that caches a subset of the translation information of the macro-TLB for all of the plurality of threads, and a plurality of nano-TLBs associated with the plurality of threads, that caches translation information only for the associated thread. The method also includes selecting one of the plurality of threads for providing a virtual fetch address, and selecting one of the nano-TLBs associated with the one of the plurality of threads selected to provide the virtual fetch address. The method also includes looking up the virtual address in the macro-TLB, micro-TLB, and selected nano-TLB. The method also includes providing to the instruction cache a physical address translated from the virtual address provided by one of the macro-, micro-, or selected nano-TLBs in which the virtual address hits.

In another aspect, the present invention provides a multithreading microprocessor for concurrently fetching and executing instructions of a plurality of threads and supporting a virtual memory system. The microprocessor includes an instruction cache, for caching instructions of the plurality of threads. The microprocessor also includes a virtual fetch address, for each of the plurality of threads, for accessing the instruction cache. The microprocessor also includes an instruction fetcher, coupled to the instruction cache. The instruction fetcher includes a fetch scheduler that selects each clock cycle the virtual fetch address of one of the plurality of threads for fetching from the instruction cache. The instruction fetcher also includes a macro-TLB, a micro-TLB, and a plurality of nano-TLBs each associated with a respective one of the plurality of threads. The macro-TLB caches physical address translations for memory pages for the plurality of threads. The micro-TLB has a plurality of entries configured to cache the translations for a subset of the memory pages cached in the macro-TLB. The nano-TLBs each cache a physical address translation of at least one memory page for the respective one of the plurality of threads.

In another aspect, the present invention provides a computer program product for use with a computing device, the computer program product comprising a computer usable medium, having computer readable program code embodied in the medium, for causing a three-tiered translation lookaside buffer (TLB) apparatus in a multithreading microprocessor that concurrently fetches and executes instructions of a plurality of threads, for providing virtual-to-physical address translation information for a memory page in response to an instruction cache virtual fetch address for one of the plurality of threads. The computer readable program code includes first program code for providing a third-level TLB, for caching virtual-to-physical address translation information for a plurality of memory pages for the plurality of threads. The computer readable program code also includes second program code for providing a second-level TLB, coupled to the third-level TLB, having a plurality of entries for caching the information for a subset of the plurality of memory pages cached in the third-level TLB. The computer readable program code also includes third program code for providing a first-level TLB for each of a respective one of the plurality of threads, each the first-level TLB having at least one entry for caching address translation information only for the respective one of the plurality of threads.

In another aspect, the present invention provides a computer data signal embodied in a transmission medium, comprising computer-readable program code for providing a three-tiered translation lookaside buffer (TLB) apparatus in a multithreading microprocessor that concurrently fetches and executes instructions of a plurality of threads. The program code includes first program code for providing a third-level TLB, for caching virtual-to-physical address translation information for a plurality of memory pages for the plurality of threads. The program code also includes second program code for providing a second-level TLB, coupled to the third-level TLB, having a plurality of entries for caching the information for a subset of the plurality of memory pages cached in the third-level TLB. The program code also includes third program code for providing a first-level TLB for each of a respective one of the plurality of threads, each the first-level TLB having at least one entry for caching address translation information only for the respective one of the plurality of threads.

In another aspect, the present invention provides a three-tiered translation lookaside buffer (TLB) apparatus in a multithreading microprocessor that concurrently fetches and executes instructions of a plurality of threads. The apparatus includes a macro-TLB that caches virtual-to-physical address translation information for a plurality of memory pages for the plurality of threads. The apparatus also includes a micro-TLB, having a plurality of entries for caching the information for a subset of the plurality of memory pages cached in the macro-TLB. The apparatus also includes a nano-TLB for each of a respective one of the plurality of threads, each having at least one entry for caching address translation information only for the respective one of the plurality of threads. Each of the nano-TLBs includes a pointer for indicating one, if any, of the micro-TLB entries. The apparatus also includes control logic, coupled to the macro-, micro-, and nano-TLBs, that updates the pointers in response to lookups, evictions and refills of the micro-TLB and the nano-TLBs. The control logic updates the pointers such that for each of the plurality of threads, either address translation information for a memory page from which an instruction was most recently fetched is cached in the respective nano-TLB and the pointer indicates none of the micro-TLB entries, or the pointer indicates one of the micro-TLB entries caching the most recent address translation information.

DETAILED DESCRIPTION

Figure 1:
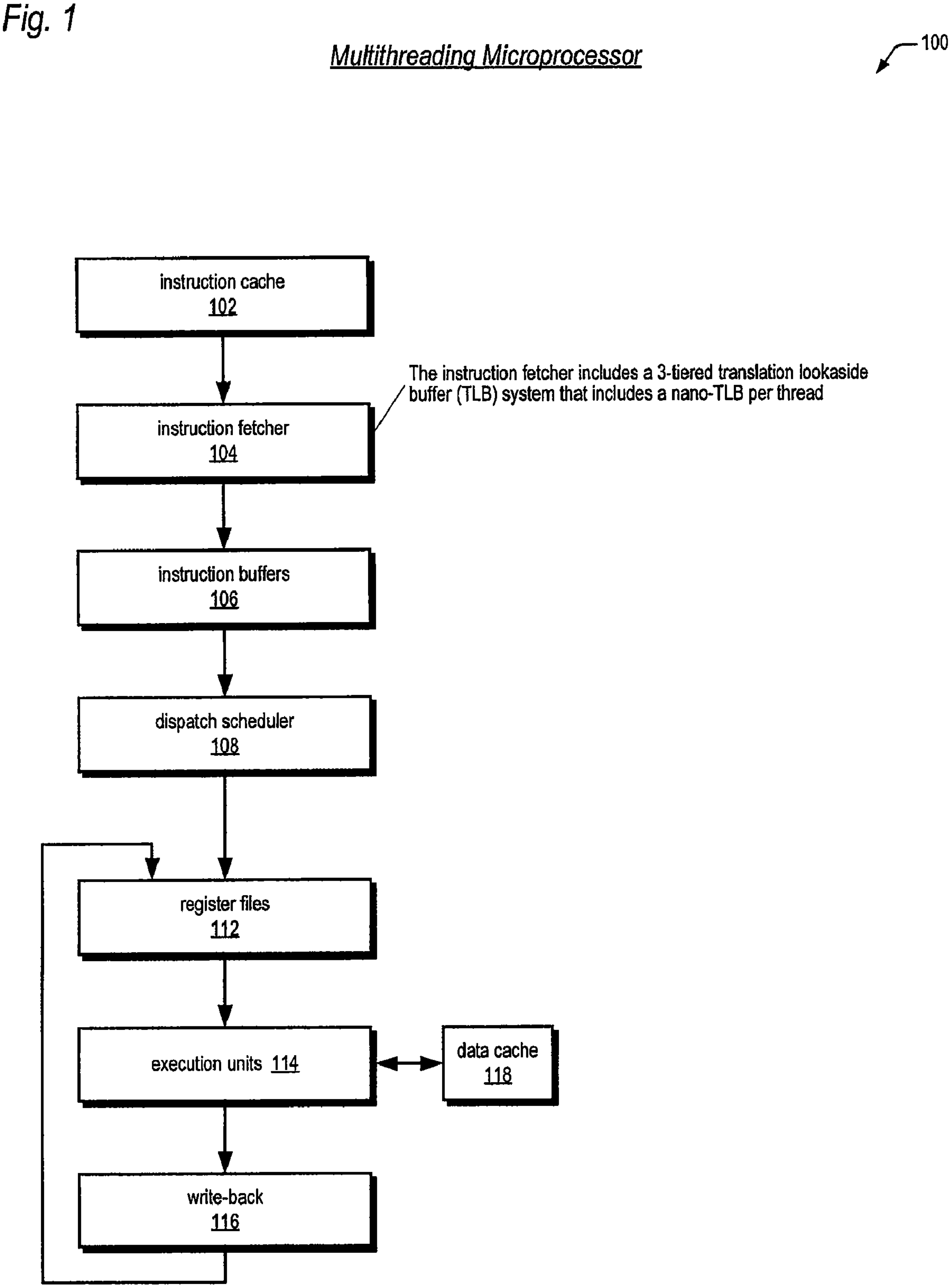
FIG. 1 is a block diagram illustrating a pipelined multithreading microprocessor according to the present invention.

Referring now to FIG. 1, a block diagram illustrating a pipelined multithreading microprocessor 100 according to the present invention is shown. The microprocessor 100 is included as part of a computing system including a physical memory logically separated into multiple pages. The system is a virtual memory system. In one embodiment, the system includes operating system software that creates the mapping between virtual memory addresses and physical memory addresses.

The microprocessor 100 is configured to concurrently execute a plurality of threads. A thread—also referred to herein as a thread of execution, or instruction stream—comprises a sequence, or stream, of program instructions. The threads may be from different programs executing on the microprocessor 100, or may be instruction streams from different parts of the same program executing on the microprocessor 100, or a combination thereof. In particular, the instructions of the threads may reside in different physical memory pages of the system from each other, and the instructions of each of the threads may span multiple physical memory pages.

Each thread has an associated thread context (TC). A thread context comprises a collection of storage elements, such as registers or latches, and/or bits in the storage elements of the microprocessor 100 that describe the state of execution of a thread. That is, the thread context describes the state of its respective thread, which is unique to the thread, rather than state shared with other threads of execution executing concurrently on the microprocessor 100. By storing the state of each thread in the thread contexts, the microprocessor 100 is configured to quickly switch between threads to fetch and issue instructions. In one embodiment, each thread context includes a program counter (PC), a general purpose register set, and thread control registers, which are included in register files 112 of the microprocessor 100.

The microprocessor 100 concurrently executes the threads according to a scheduling policy that dictates the fetching and issuing of instructions of the various threads. The multithreaded microprocessor 100 allows the multiple threads to share the functional units of the microprocessor 100 (e.g., instruction fetch and decode units, caches, branch prediction units, and execution units, such as load/store, integer, floating-point, SIMD, and other execution units) in a concurrent fashion.

The microprocessor 100 includes an instruction cache 102 for caching program instructions—in particular, the instructions of the various threads—fetched from the system memory. In one embodiment, the instruction cache 102 is indexed by a virtual fetch address to select a set of cache line and tag entries. The selected set of tag entries are subsequently compared with a physical address tag portion of the physical fetch address to determine whether the physical fetch address hits in the instruction cache 102, and if so, which way of the instruction cache 102 the physical fetch address hit in. As described below in detail, the translation of the virtual page address to the physical page address is performed by a TLB system according to the present invention, which includes a three-tiered TLB architecture in which the lowest tier has a nano-TLB dedicated to each thread context.

The microprocessor 100 also includes an instruction fetcher 104, or instruction fetch pipeline 104, coupled to concurrently fetch instructions of the multiple threads from the instruction cache 102 and/or system memory into instruction buffers 106, coupled to the instruction fetcher 104. In one embodiment, each thread context includes its own instruction buffer 106. In one embodiment, the instruction fetch pipeline 104 includes a four stage pipeline. The instruction fetcher 104 includes the TLB system according to the present invention described herein.

The instruction buffers 106 provide instructions to a instruction dispatch scheduler 108, or thread scheduler 108. Each clock cycle, the scheduler 108 selects an instruction from one of the threads and issues the instruction for execution by execution units 114 of the microprocessor 100 pipeline. The register files 112 are coupled to the scheduler 108 and provide instruction operands to execution units 114 that execute the instructions. The microprocessor 100 also includes a data cache 118 coupled to the execution units 114.

The execution units 114 may include, but are not limited to, integer execution units, floating-point execution units, SIMD execution units, load/store units, and branch execution units. Each thread context includes its own register file 112, and each register file includes its own program counter, general purpose register set, and thread control registers. The instruction fetcher 104 fetches instructions of the threads based on the program counter value of each thread context.

The microprocessor 100 pipeline also includes a write-back stage 116 that writes instruction results back into the register files 112. In one embodiment, the microprocessor 100 pipeline also includes an exception resolution stage coupled between the execution units 114 and the write-back stage 116.

Figure 2:
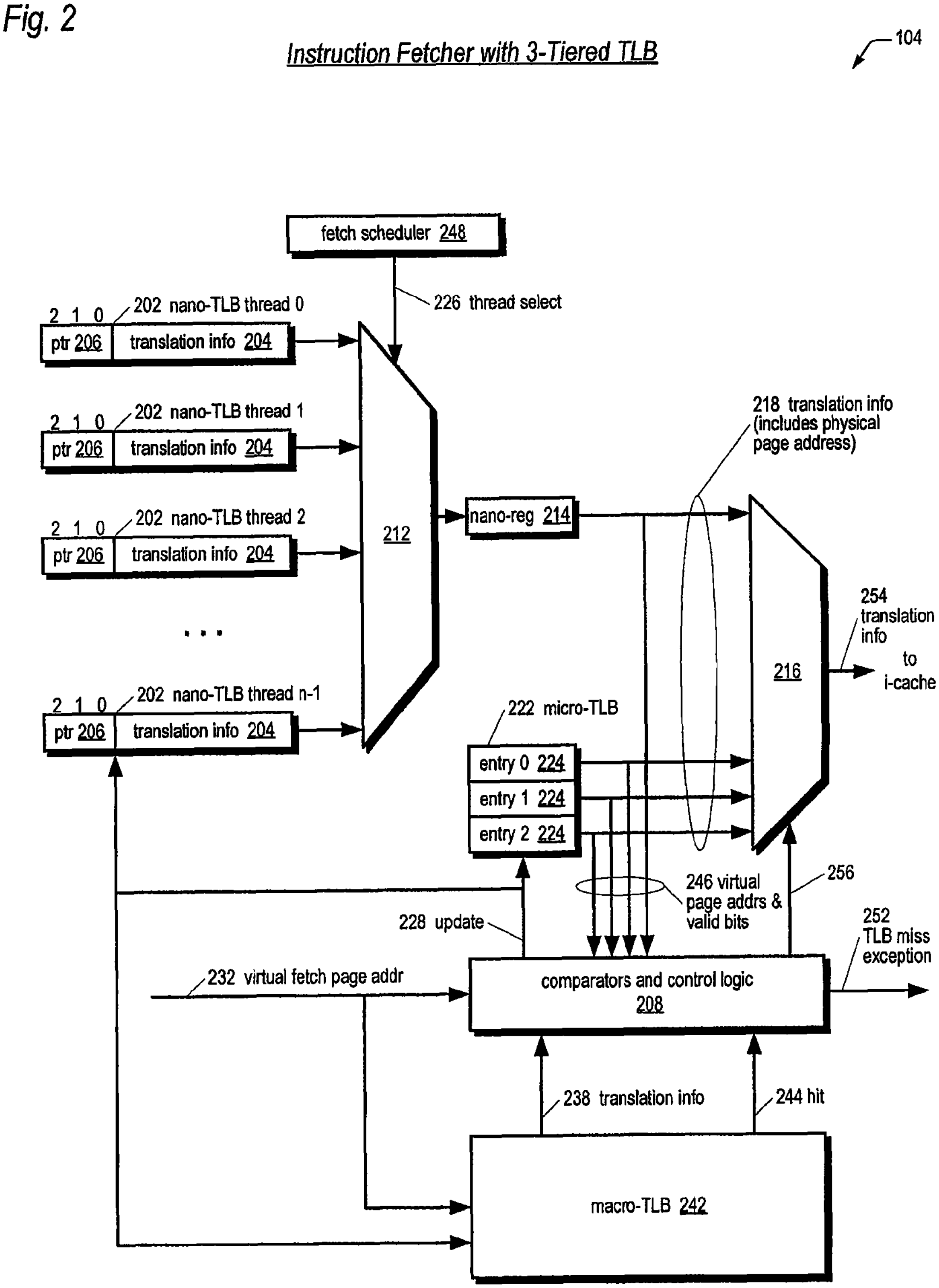
FIG. 2 is a block diagram illustrating portions of the instruction fetcher of FIG. 1 according to the present invention.

Referring now to FIG. 2, a block diagram illustrating portions of the instruction fetcher 104 of FIG. 1 according to the present invention is shown. The instruction fetcher 104 includes a nano-TLB 202 for each thread context, a micro-TLB 222, and a macro-TLB 242. Each nano-TLB 202 stores virtual to physical address translation information 204 only for its particular thread context. In contrast, the micro-TLB 222 and macro-TLB 242 may store physical address translation information for any or all of the thread contexts. In the embodiment of FIG. 2, the micro-TLB 222 includes three entries 224, denoted entry 0, entry 1, and entry 2; and the macro-TLB 242 includes 64 entries. In one embodiment, the micro-TLB 222 is a one clock cycle access cache. That is, the micro-TLB 222 is configured to provide the translation information stored in the hitting entry 224 in the same clock cycle of the microprocessor 100 that the virtual fetch page address 232 is applied to the micro-TLB 222. In one embodiment, the macro-TLB 242 is a three clock cycle access cache.

The instruction fetcher 104 also includes a mux 212 that receives the translation information 204 from each of the nano-TLBs 202 and selects one of the thread contexts to provide its translation information 204 to a nano-register 214 based on a thread select signal 226 generated by a fetch scheduler 248. Each clock cycle, the fetch scheduler 248 generates the thread select signal 226 to specify which of the thread contexts has been chosen for instruction fetching. In one embodiment, the thread select signal 226 is a 1-hot N-bit vector where N is the number of thread contexts.

The translation information stored in each of the TLBs 202/222/242 includes a cached virtual page address and translated physical page address. In one embodiment, the micro-TLB 222 and macro-TLB 242 each include a tag array for storing the virtual page addresses and a separate data array for storing the physical page addresses. The translation information may also include page attribute information; an address space identifier, for identifying an address space of a process; a valid bit; page mask bits, used to determine the size of the page specified by the TLB entry; and a global bit, for indicating whether the page is globally shared by all processes.

Additionally, each nano-TLB 202 includes a pointer 206. In one embodiment, the pointer 206 includes one bit for each entry 224 in the micro-TLB 222. At most, one bit of the pointer 206 is set at a time to point to one of the micro-TLB 222 entries 224 to indicate that the corresponding micro-TLB 222 entry 224 is storing the most recently used page translation information for the thread context associated with the nano-TLB 202. If no bits of the pointer 206 are set (i.e., if the pointer 206 is cleared to zero), then the micro-TLB 222 is not storing the most recently used page translation information for the thread context associated with the nano-TLB 202, which is instead stored in the nano-TLB 202.

The instruction fetcher 104 also includes a second mux 216 that receives the selected nano-TLB 202 translation information 204 from the nano-register 214 and also receives the translation information from each entry 224 of the micro-TLB 222. The instruction fetcher 104 also includes comparators and control logic 208, coupled to the TLBs 202/222/242 and mux 216. The comparators and control logic 208 receive a virtual fetch page address 232 that is the page address bits (e.g., bit 12 and above if the page size is 4 KB) of the virtual fetch address used to index the instruction cache 102. The comparators and control logic 208 also receive the valid bit and virtual page address 246 portion of the translation information received from each of the micro-TLB 222 entries 224 and from the nano-register 214. The comparators 208 compare the virtual fetch page address 232 to each of the virtual page addresses 246 to determine whether a valid match occurs. If a match occurs with a valid virtual page address 246 (i.e., if the virtual fetch page address 232 hits in the micro-TLB 222 or selected nano-TLB 202), the control logic 208 generates a control signal 256 to cause mux 216 to select the translation information 218 from the nano-register 214 if its virtual page address 246 matches the virtual fetch page address 232, or to select the translation information 218 from one of the micro-TLB 222 entries 224 if one of their virtual page addresses 246 matches the virtual fetch page address 232, for provision to the instruction cache 102 on a signal 254. The control logic 208 also generates update signals 228 to update each of the TLBs 202/222/242 based on whether the virtual fetch page address 232 hits or misses in the TLBs 202/222/242, as described below with respect to FIG. 3.

The macro-TLB 242 also compares the virtual fetch page address 232 with the virtual page address information stored in its entries to determine whether a match occurs. If the virtual fetch page address 232 matches a valid entry in the macro-TLB 242 (i.e., if the virtual fetch page address 232 hits in the macro-TLB 242), the macro-TLB 242 outputs to the comparators and control logic 208 a true value on a hit signal 244 and outputs the translation information 238 of the hitting entry; otherwise, the macro-TLB 242 generates a false value on the hit signal 244. If the virtual fetch page address 232 misses in the selected nano-TLB 202, the micro-TLB 222, and the macro-TLB 242, then the control logic 208 generates a true value on a TLB miss exception signal 252 to indicate an exception condition. In one embodiment, the exception condition causes a software exception to enable system software to perform a page table walk to provide the needed translation information for the page specified in the virtual fetch page address 232.

Figure 3:
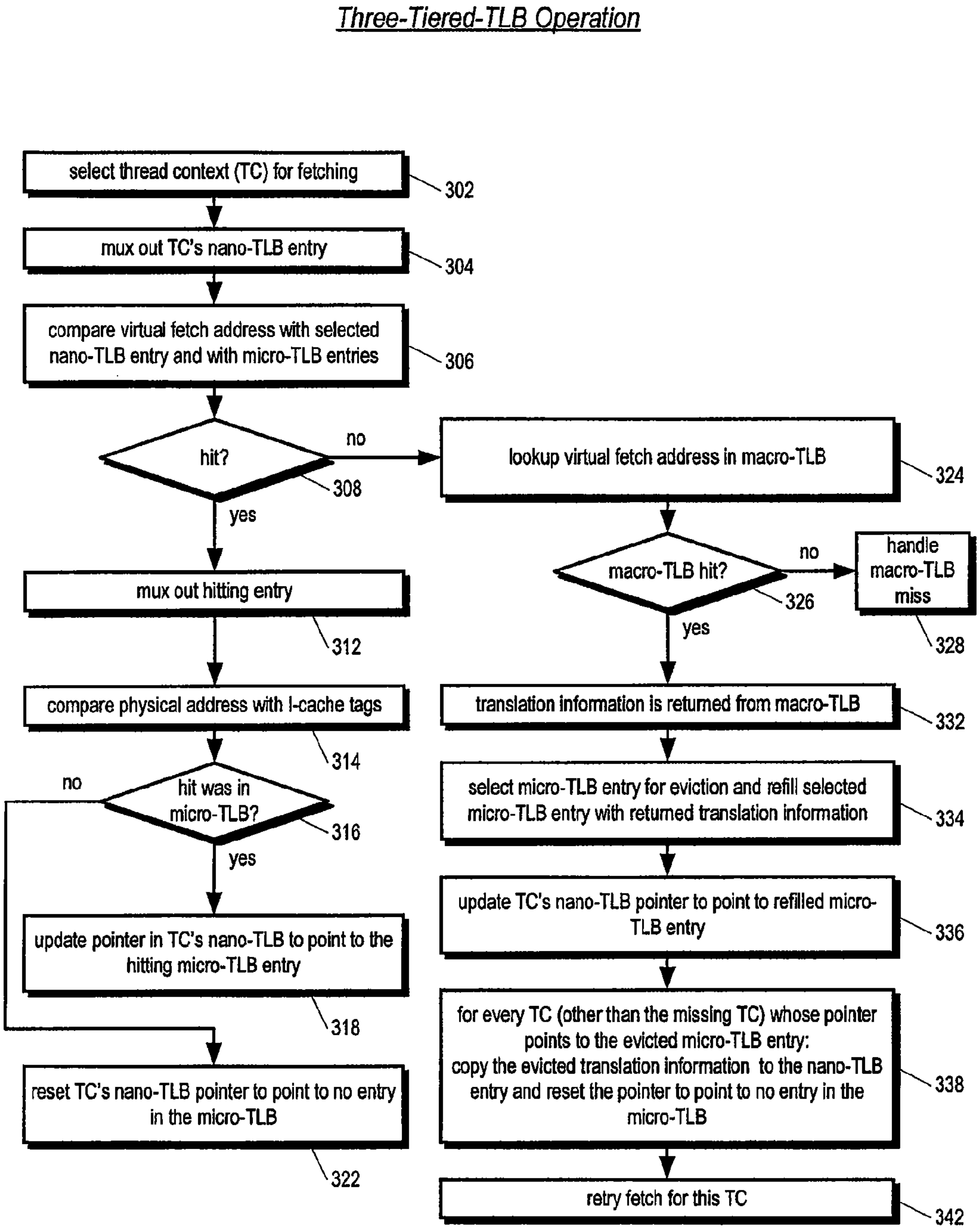
FIG. 3 is a flowchart illustrating operation of the instruction fetcher of FIG. 2 according to the present invention.

Referring now to FIG. 3, a flowchart illustrating operation of the instruction fetcher 104 of FIG. 2 according to the present invention is shown. Flow begins at block 302.

At block 302, the fetch scheduler 248 selects a thread context for fetching during the current microprocessor 100 clock cycle and indicates the selected thread context on the thread select signal 226. Flow proceeds to block 304.

At block 304, mux 212 selects the translation information 204 of one of the nano-TLBs 202 specified by the thread select signal 226 for storing in the nano-register 214. In one embodiment, the selected translation information 204 is stored into the nano-register 214 on the next clock cycle after the fetch scheduler 248 selects a thread context for fetching. Flow proceeds to block 306.

At block 306, the comparators compare the virtual fetch page address 232 with the virtual page addresses 246 of the micro-TLB 222 entries 224 and the nano-register 214 and the control logic 208 examines the valid bits 246. Flow proceeds to decision block 308.

At decision block 308, the control logic 208 determines whether the virtual fetch page address 232 hit in at least the micro-TLB 222 or the selected nano-TLB 202. If not, flow proceeds to block 324; otherwise, flow proceeds to block 312.

At block 312, the control logic 208 generates control signal 256 to cause mux 216 to select the translation information 218 from the hitting micro-TLB 222 entry 224 or nano-register 214 for provision to the instruction cache 102 on signal 254. Flow proceeds to block 314.

At block 314, the instruction cache 102 compares the physical address portion of the translation information 218 provided by mux 216 with the physical address tags of the instruction cache 102 to determine whether the fetch address hits in the instruction cache 102. In one embodiment, the instruction cache 102 is virtually indexed and physically tagged. The instruction cache 102 is being indexed by the virtual address in parallel with the lookup of the virtual address in the TLBs. Once the TLBs provide the physical address, it is used to compare with the tags in the indexed instruction cache 102 set. Flow proceeds to decision block 316.

At decision block 316, the control logic 208 determines whether the hit determined at decision block 308 was in the micro-TLB 222 or the nano-TLB 202 of the thread context selected for fetching at block 302. If the hit was in the nano-TLB 202, then flow proceeds to block 322. If the hit was in the micro-TLB 222, then flow proceeds to block 318.

At block 318, the control logic 208 updates, via update signal 228, the pointer 206 in the nano-TLB 202 to point to the hitting micro-TLB 222 entry 224. That is, if the virtual fetch page address 232 hit in micro-TLB 222 entry 0 224, then the control logic 208 sets bit 0 of the pointer 206; if the virtual fetch page address 232 hit in micro-TLB 222 entry 1 224, then the control logic 208 sets bit 1 of the pointer 206; and if the virtual fetch page address 232 hit in micro-TLB 222 entry 2 224, then the control logic 208 sets bit 2 of the pointer 206. Thus, advantageously, the nano-TLB 202 always stores information relating to the most recently used translation information for the respective thread context: either the nano-TLB 202 stores the most recently used translation information 204 itself, or it stores in the pointer 206 a value pointing to the micro-TLB 222 entry 224 containing the most recently used translation information for the thread context. As described below with respect to block 338, the control logic 208 uses the pointer 206 to copy the most recently used translation information for the thread context from the micro-TLB 222 to the nano-TLB 202 if the micro-TLB 222 entry 224 is to be evicted. Flow ends at block 318.

At block 322, the control logic 208 resets the nano-TLB 202 pointer 206 to point to no entry in the micro-TLB 222. That is, all of the bits of the pointer 206 are cleared to zero. The pointer 206 is cleared so that the control logic 208 does not copy the translation information from the micro-TLB 222 to the nano-TLB 202 at block 338 if a micro-TLB 222 entry 224 is to be evicted, since the most recently used translation information for the thread context is currently cached in the nano-TLB 202. In one embodiment, resetting the nano-TLB 202 pointer 206 at block 322 (and also at block 338) comprises updating the pointer to a value having more than one bit set to indicate no entry in the micro-TLB 222 is storing the most recently used translation information for the thread context so that the control logic 208 does not copy the translation information from the micro-TLB 222 to the nano-TLB 202 at block 338 if a micro-TLB 222 entry 224 is to be evicted. Flow ends at block 322.

At block 324, the macro-TLB 242 looks up the virtual fetch page address 232 in its tag array. In one embodiment, the macro-TLB 242 is accessed in parallel with the nano-register 214 and micro-TLB 222. In another embodiment, the macro-TLB 242 is not accessed until the control logic 208 determines that the virtual fetch page address 232 misses in the micro-TLB 222 and selected nano-TLB 202. Flow proceeds to decision block 326.

At decision block 326, the control logic 208 examines hit signal 244 to determine whether the virtual fetch page address 232 hit in the macro-TLB 242. If so, flow proceeds to block 332; otherwise, flow proceeds to block 328.

At block 328, the control logic 208 generates a TLB miss exception 252 to enable system software to translate the virtual fetch page address 232 to a physical page address and to generate the other translation information for updating the TLBs 202/222/242. Flow ends at block 328. In another embodiment, the instruction fetcher 104 includes hardware configured to perform a page table walk to generate the missing translation information, and in this embodiment, flow proceeds from block 328 to block 332.

At block 332, the macro-TLB 242 provides the translation information 238 to the control logic 208. Flow proceeds to block 334.

At block 334, the control logic 208 selects one of the entries 224 of the micro-TLB 222 to evict and refills the selected micro-TLB 222 entry 224 with the translation information 238 from the macro-TLB 242. The control logic 208 also saves the evicted translation information from the selected micro-TLB 222 entry 224 for use at block 338. In one embodiment, the micro-TLB 222 maintains least-recently-used information for the entries 224 and selects the least-recently-used entry 224 for eviction. Flow proceeds to block 336.

At block 336, the control logic 208 updates the pointer 206 in the nano-TLB 202 associated with the thread context selected at block 302 to point to the micro-TLB 222 entry 224 that was refilled at block 334. Thus, advantageously, the nano-TLB 202 pointer 206 points to the micro-TLB 222 entry 224 storing the most recently used translation information for the thread context. Flow proceeds to block 338.

At block 338, the control logic 208 determines which nano-TLBs 202, other than the nano-TLB 202 selected at block 302, have a pointer 206 value that points to the micro-TLB 222 entry 224 evicted at block 334. For each of these nano-TLBs 202, the control logic 208 copies the translation information evicted from the micro-TLB 222 at block 334 to the translation information 204, and resets the pointer 206 to point to no entry 224 in the micro-TLB 222. Thus, advantageously, the nano-TLB 202 is storing the most recently used translation information for the thread context. However, if the pointer 206 is not pointing to the evicted micro-TLB 222 entry 224, the most recently used translation information for the thread context continues to be stored in either a different entry 224 of the micro-TLB 222 or in the nano-TLB 202 of the thread context; thus, advantageously, it may be that translation information for multiple pages of the thread context may be stored in the micro-TLB 222/nano-TLB 202 combination. In the embodiment of FIG. 2 in which the micro-TLB 222 includes three entries 224, depending upon the dynamics of pages referenced, in some cases for a period of time the micro-TLB 222/nano-TLB 202 combination may be storing translation information for up to four of the most recently accessed pages by a thread context: one in the nano-TLB 202 of the thread context, and three in the micro-TLB 222. Similarly, in some cases the micro-TLB 222/nano-TLB 202 combination may be storing translation information for three of the most recently accessed pages by one thread context and two of the most recently accessed pages by another thread context. Still further, in some cases the micro-TLB 222/nano-TLB 202 combination may be storing translation information for two of the most recently accessed pages by three different thread contexts. Flow proceeds to block 342.

At block 342, the instruction cache 102 fetch at the virtual fetch address 232 selected at block 302 is retried. In one embodiment, the fetch is retried by restarting the fetch at the top of the instruction fetcher 104 pipeline. In one embodiment, once the micro-TLB 222 is refilled and the nano-TLB 202 is updated at blocks 334/336/338, the fetch scheduler 248 immediately selects the missing thread context previously selected at block 302 for fetching via signal 226; however, in another embodiment, once the micro-TLB 222 is refilled and the nano-TLB 202 is updated at blocks 334/336/338, the missing thread context is simply enabled for selection among the other thread contexts according to the normal fetch scheduling algorithm. Flow ends at block 342.

Figure 4:
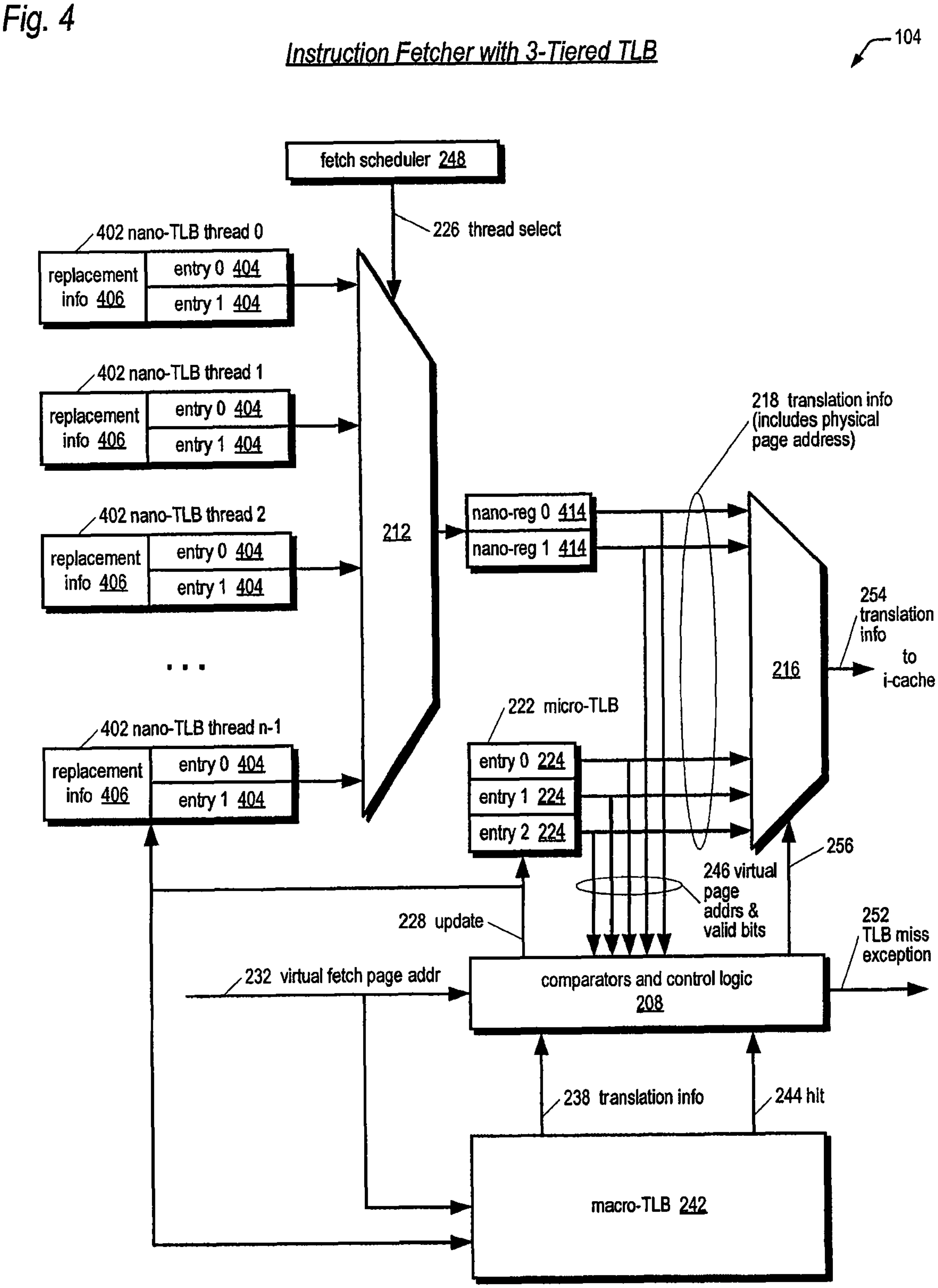
FIG. 4 is a block diagram illustrating portions of the instruction fetcher of FIG. 1 according to an alternate embodiment of the present invention.

Referring now to FIG. 4, a block diagram illustrating portions of the instruction fetcher 104 of FIG. 1 according to an alternate embodiment of the present invention is shown. The instruction fetcher 104 of FIG. 4 is similar to the instruction fetcher 104 of FIG. 2; however, the nano-TLBs 402 of FIG. 4 include a plurality of entries 404 (rather than a single entry 204 of FIG. 2) for storing virtual to physical address translation information for two memory pages for its associated thread context. FIG. 4 illustrates an embodiment in which each nano-TLB 402 includes two entries 404, denoted entry 0 and entry 1. Although FIG. 4 illustrates nano-TLBs 402 with two entries, nano-TLBs 402 with more than two entries may be employed.

Another difference between the instruction fetcher 104 of FIG. 4 and the instruction fetcher 104 of FIG. 2 is the instruction fetcher 104 of FIG. 4 includes a plurality of nano-registers 414 equal to the number of entries 404 in each nano-TLB 402. Since the embodiment of FIG. 4 includes nano-TLBs 402 with two entries, FIG. 4 includes two nano-registers 414, denoted nano-reg 0 and nano-reg 1. The mux 212 receives the translation information from each of the nano-TLBs 402 and selects one of the thread contexts to provide the translation information from each of the entries 404 of the selected thread context's nano-TLB 402 to its respective nano-register 414 based on the thread select signal 226 generated by the fetch scheduler 248. The valid bit and virtual page address 246 portion of the translation information from all of the nano-registers 414 is provided to the comparators and control logic 208, and the translation information 218 from all of the nano-registers 414 is provided to the second mux 216. The control logic 208 causes the mux 216 to select the translation information 218 from one of the nano-registers 414 if one of their virtual page addresses 246 matches the virtual fetch page address 232, or to select the translation information 218 from one of the micro-TLB 222 entries 224 if one of their virtual page addresses 246 matches the virtual fetch page address 232.

Another difference between the nano-TLBs 402 of Figure and the nano-TLBs 202 of FIG. 2 is each nano-TLB 402 stores replacement information 406 that indicates the entries of the nano-TLB 402 and the micro-TLB 222 that are storing the most recently used virtual to physical address translation information for the thread context associated with the nano-TLB 402. The replacement information 406 is used to determine whether an evicted micro-TLB 222 entry 224 should be copied to a nano-TLB 402 entry (functioning similar to the pointer 206 of FIG. 2), as described with respect to FIG. 5. Additionally, the replacement information 406 may be used to select one of the nano-TLB 402 entries 404 for replacement if the evicted micro-TLB 222 entry 224 is copied to the nano-TLB 402.

In one embodiment, the replacement information 406 comprises N pointers pointing to the N most recently used entries 404/224 in both the respective nano-TLB 402 and the micro-TLB 222. In one embodiment, the N pointers comprise an ordered list from most recently used to least recently used entries 404/224. In this embodiment, the least recently used nano-TLB 402 entry 404 is known and may be selected for replacement by an evicted micro-TLB 222 entry 224. In another embodiment, the N pointers simply point to the N most recently used entries 404/224, without indicating their order. In one embodiment N may be equal to the number of nano-TLB 402 entries 404. In other embodiments, N may be different than the number of nano-TLB 402 entries 404. In one embodiment, N is one, and the single pointer points to the single most recently used entry 404/224 in either the respective nano-TLB 402 or the micro-TLB 222 creating a not-last-used scheme. In one embodiment, N is equal to the sum of the number of micro-TLB 222 entries 224 and the number of entries 404 in a nano-TLB 402.

In one embodiment, the replacement information 406 comprises separate information for indicating which micro-TLB 222 entries 224 are most recently used for deciding whether to copy an evicted micro-TLB 222 entry 224 to the nano-TLB 402, and other information for deciding which nano-TLB 402 entry 404 to replace when an evicted micro-TLB 222 entry is copied to the nano-TLB 402, as described below with respect to block 538. Embodiments are contemplated in which the information for deciding which nano-TLB 402 entry 404 to replace when an evicted micro-TLB 222 entry is copied to the nano-TLB 402 comprises information for use in selecting the oldest entry 404; the least-recently-used entry 404; the next entry 404 in round-robin order; or a random entry 404.

In one embodiment, the replacement information 406 comprises pseudo-LRU (least recently used) information. For example, in an embodiment in which the nano-TLBs 402 have two entries 404 (addressed as 0 and 1) and the micro-TLB 222 has six entries 224 (addressed as 2 through 7) making eight total entries 404/224, the replacement information 406 comprises seven bits that indicate the following information:

| |
|---|
| bit 0 indicates whether entry 0 or 1 was more recently used |
| bit 1 indicates whether entry 2 or 3 was more recently used |
| bit 2 indicates whether entry 4 or 5 was more recently used |
| bit 3 indicates whether entry 6 or 7 was more recently used |
| bit 4 indicates whether entry 0/1 or 2/3 was more recently used |
| bit 5 indicates whether entry 4/5 or 6/7 was more recently used |
| bit 6 indicates whether entry 0/1/2/3 or 4/5/6/7 was more recently used |

In the pseudo-LRU embodiment, the replacement information 406 may be used both for deciding whether to copy an evicted micro-TLB 222 entry 224 to the nano-TLB 402 and for deciding which nano-TLB 402 entry 404 to replace when an evicted micro-TLB 222 entry is copied to the nano-TLB 402.

Figure 5:
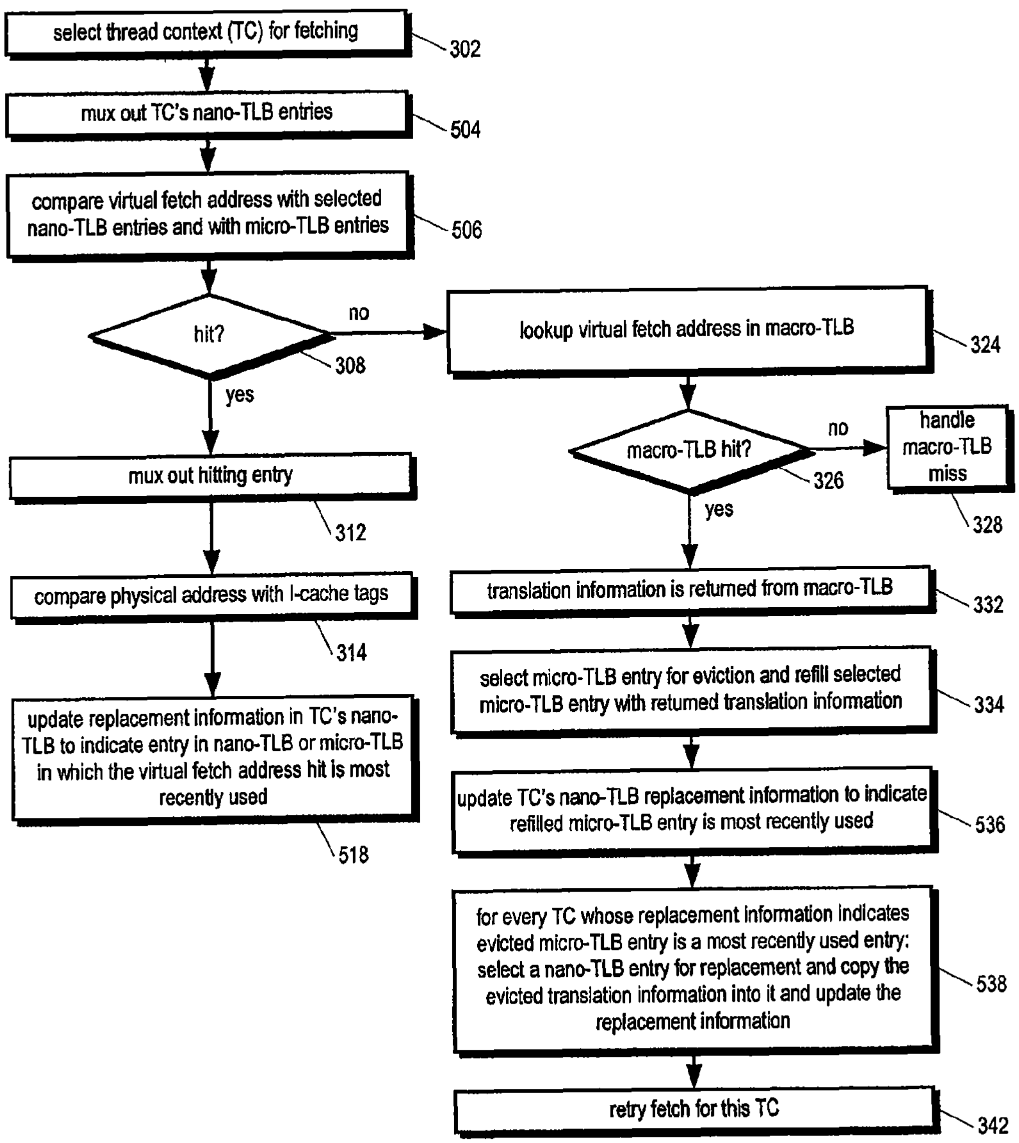
FIG. 5 is a flowchart illustrating operation of the instruction fetcher of FIG. 2 according to an alternate embodiment of the present invention.

Referring now to FIG. 5, a flowchart illustrating operation of the instruction fetcher 104 of FIG. 4 according to an alternate embodiment of the present invention is shown. FIG. 5 is similar to FIG. 3 and like-numbered blocks are alike. Flow begins at block 302.

At block 302, the fetch scheduler 248 selects a thread context for fetching during the current microprocessor 100 clock cycle and indicates the selected thread context on the thread select signal 226. Flow proceeds to block 504.

At block 504, mux 212 selects the translation information of the entries 404 of one of the nano-TLBs 402 specified by the thread select signal 226 for storing in the nano-registers 414. In one embodiment, the translation information of the selected entries 404 is stored into the nano-registers 414 on the next clock cycle after the fetch scheduler 248 selects a thread context for fetching. Flow proceeds to block 506.

At block 506, the comparators compare the virtual fetch page address 232 with the virtual page addresses 246 of the micro-TLB 222 entries 224 and the nano-registers 414 and the control logic 208 examines the valid bits 246. Flow proceeds to decision block 308.

At decision block 308, the control logic 208 determines whether the virtual fetch page address 232 hit in at least the micro-TLB 222 or the selected nano-TLB 402. If not, flow proceeds to block 324; otherwise, flow proceeds to block 312.

At block 312, the control logic 208 generates control signal 256 to cause mux 216 to select the translation information 218 from the hitting micro-TLB 222 entry 224 or hitting nano-register 414 for provision to the instruction cache 102 on signal 254. Flow proceeds to block 314.

At block 314, the instruction cache 102 compares the physical address portion of the translation information 218 provided by mux 216 with the physical address tags of the instruction cache 102 to determine whether the fetch address hits in the instruction cache 102. In one embodiment, the instruction cache 102 is virtually indexed and physically tagged. The instruction cache 102 is being indexed by the virtual address in parallel with the lookup of the virtual address in the TLBs. Once the TLBs provide the physical address, it is used to compare with the tags in the indexed instruction cache 102 set. Flow proceeds to block 518.

At block 518, the control logic 208, via update signal 228, updates the replacement information 406 in the nano-TLB 402 to indicate that the entry 404/224 in the micro-TLB 222 or nano-TLB 402 that had a valid match with the virtual fetch address 232 is now the most recently used entry 404/224. Advantageously, in the embodiment in which the replacement information 406 comprises N pointers pointing to the N most recently used entries 404/224, at least the N most recently used address translation information for the thread context is guaranteed to be available in either the nano-TLB 402 or micro-TLB 222. In the embodiment in which the replacement information 406 comprises pseudo-LRU information, at least the one most recently used address translation information for the thread context is guaranteed to be available in either the nano-TLB 402 or micro-TLB 222, and it is likely that more than the one most recently address translation information for the thread context is available in either the nano-TLB 402 or micro-TLB 222. Flow ends at block 518.

At block 324, the macro-TLB 242 looks up the virtual fetch page address 232 in its tag array. In one embodiment, the macro-TLB 242 is accessed in parallel with the nano-registers 414 and micro-TLB 222. In another embodiment, the macro-TLB 242 is not accessed until the control logic 208 determines that the virtual fetch page address 232 misses in the micro-TLB 222 and selected nano-TLB 402. Flow proceeds to decision block 326.

At decision block 326, the control logic 208 examines hit signal 244 to determine whether the virtual fetch page address 232 hit in the macro-TLB 242. If so, flow proceeds to block 332; otherwise, flow proceeds to block 328.

At block 328, the control logic 208 generates a TLB miss exception 252 to enable system software to translate the virtual fetch page address 232 to a physical page address and to generate the other translation information for updating the TLBs 402/222/242. Flow ends at block 328. In another embodiment, the instruction fetcher 104 includes hardware configured to perform a page table walk to generate the missing translation information, and in this embodiment, flow proceeds from block 328 to block 332.

At block 332, the macro-TLB 242 provides the translation information 238 to the control logic 208. Flow proceeds to block 334.

At block 334, the control logic 208 selects one of the entries 224 of the micro-TLB 222 to evict and refills the selected micro-TLB 222 entry 224 with the translation information 238 from the macro-TLB 242. The control logic 208 also saves the evicted translation information from the selected micro-TLB 222 entry 224 for use at block 538. In one embodiment, the micro-TLB 222 maintains least-recently-used information for the entries 224 and selects the least-recently-used entry 224 for eviction. Flow proceeds to block 536.

At block 536, the control logic 208 updates the replacement information 406 in the nano-TLB 402 to indicate that the refilled micro-TLB 222 entry 224 is now the most recently used entry 224. Flow proceeds to block 538.

At block 538, the control logic 208 determines from each nano-TLB's 402 replacement information 406 whether the micro-TLB 222 entry 224 evicted at block 334 is a most recently used entry 224 for each respective thread context.

For each of these nano-TLBs 402, the control logic 208 copies the translation information evicted from the micro-TLB 222 entry 224 at block 334 to an entry 404 of the respective nano-TLB 402, and updates the replacement information 406 accordingly. In particular, the replacement information 406 is updated to indicate the most recently used translation information evicted from the micro-TLB 222 entry 224 is now cached in the copied to nano-TLB 402 entry 404 and not in the evicted micro-TLB 222 entry 224. Thus, advantageously, the nano-TLB 402 is storing a most recently used translation information for the thread context. However, if the replacement information 406 is not indicating the evicted micro-TLB 222 entry 224 is a most recently used entry 224, most recently used translation information for the thread context continues to be stored in either a different entry 224 of the micro-TLB 222 or in the nano-TLB 402 of the thread context; thus, advantageously, it may be that translation information for multiple pages of the thread context may be stored in the micro-TLB 222/nano-TLB 402 combination. In the embodiment of FIG. 4 in which the micro-TLB 222 includes three entries 224 and the nano-TLBs 402 include two entries 404, depending upon the dynamics of pages referenced, in some cases for a period of time the micro-TLB 222/nano-TLB 402 combination may be storing translation information for up to five of the most recently accessed pages by one thread context: two in the nano-TLB 402 of the thread context, and three in the micro-TLB 222. Similarly, in some cases the micro-TLB 222/nano-TLB 402 combination may be storing translation information for three of the most recently accessed pages by one thread context and three of the most recently accessed pages by another thread context. Still further, in some cases the micro-TLB 222/nano-TLB 402 combination may be storing translation information for three of the most recently accessed pages by three different thread contexts. Flow proceeds to block 342.

At block 342, the instruction cache 102 fetch at the virtual fetch address 232 selected at block 302 is retried. In one embodiment, the fetch is retried by restarting the fetch at the top of the instruction fetcher 104 pipeline. In one embodiment, once the micro-TLB 222 is refilled and the nano-TLB 402 is updated at blocks 334/536/538, the fetch scheduler 248 immediately selects the missing thread context previously selected at block 302 for fetching via signal 226; however, in another embodiment, once the micro-TLB 222 is refilled and the nano-TLB 402 is updated at blocks 334/536/538, the missing thread context is simply enabled for selection among the other thread contexts according to the normal fetch scheduling algorithm. Flow ends at block 342.

As may be observed from the description above, the three-tiered TLB architecture with dedicated nano-TLBs per-thread context of the present invention has advantages over other possible solutions to the problems introduced by concurrently fetching instructions of multiple threads of execution in a processor. One alternative solution to the problems would be to modify a conventional two-tiered TLB architecture (i.e., a single micro-TLB backed by a single macro-TLB) to simply make the number of entries in the micro-TLB equal to the number of thread contexts supported by the processor. However, although this solution would reduce the likelihood that a given thread would continue to miss in the micro-TLB and be kept from making forward progress, it does not guarantee that all threads would continue to make forward progress in the most pathological cases. This is in contrast to the present invention, which has a nano-TLB 202 per thread context to guarantee that all threads make forward progress. Furthermore, with the alternative solution, unless the number of thread contexts supported by the processor is relatively small, the micro-TLB will be too large to be a fast TLB; or alternatively, to keep a fast micro-TLB, the processor clock speed would have to be reduced. This is in contrast to the present invention, which enables a high processor clock speed and fast TLB access for most instruction cache fetches. Still further, if the number of thread contexts supported by the processor is relatively large, the micro-TLB may approach the size of the macro-TLB, thereby making the macro-TLB essentially superfluous. This is in contrast to the present invention, in which the macro-TLB 242 continues to serve a very useful purpose of backing the nano-TLBs 202 and micro-TLB 222 to reduce the number of necessary page table walks and/or TLB miss exceptions.

Another solution to the problems introduced by concurrently fetching instructions of multiple threads of execution would be to keep a conventional two-tiered TLB architecture, but at the micro-TLB level to have a micro-TLB per-thread context. Each micro-TLB could remain small enough to be a fast TLB and the starvation problem would be addressed. However, this solution does not scale well as the number of thread contexts increases. If the number of thread contexts is large, the combined size of the micro-TLBs may impose a very large area requirement on the integrated circuit die size and may consume a large amount of power, which may be prohibitive, particularly in a design targeted at small die size and low power consumption. For example, assuming a 4-entry micro-TLB per thread context, the total number of micro-TLB entries required is 4*N, where N is the number of thread contexts, and the area and power consumed are roughly 4*N of a single entry (excluding the macro-TLB). In contrast, the embodiment shown in the three-tiered architecture of FIG. 2 requires area and power consumption of roughly 3+N, and the embodiment of FIG. 4 requires area and power consumption of roughly 3+2N, where N is the number of thread contexts (excluding the macro-TLB). Thus, the present invention is much more scalable with the number of thread contexts than the other solution.

Although the present invention and its objects, features, and advantages have been described in detail, other embodiments are encompassed by the invention. For example, although embodiments have been described with a three level TLB hierarchy, the TLB hierarchy may be extended to a larger number of levels, as long as the lowest level includes a per-thread context nano-TLB. For example, an embodiment is contemplated in which a fourth level TLB higher and larger than the macro-TLB 242 is employed to back up the macro-TLB 242.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to using hardware (e.g., within or coupled to a Central Processing Unit ("CPU"), microprocessor, microcontroller, digital signal processor, processor core, System on Chip ("SOC"), or any other programmable device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A microprocessor instruction fetcher for accessing an instruction cache using a virtual fetch address, for each of a plurality of threads, comprising:

a macro-TLB to cache physical address translations for memory pages for the plurality of threads;

a micro-TLB to cache a plurality of translation entries for a subset of the memory pages cached in the macro-TLB; and a plurality of nano-TLBs, each nano-TLB associated with a respective one of the plurality of threads to cache a physical address translation of at least one memory page for the respective one of the plurality of threads.

2. The microprocessor instruction fetcher as recited in claim 1, wherein each nano-TLB further comprises:

replacement information, to indicate which entries of the micro-TLB and the plurality of nano-TLBs are caching the most recently used physical address translation of at least one memory page for the respective one of the plurality of threads.

3. The microprocessor instruction fetcher as recited in claim 2, wherein the replacement information comprises:

a single pointer to indicate which one, if any, of the micro-TLB entries is caching the most recently used physical address translation of at least one memory page for the respective one of the plurality of threads.

4. The microprocessor instruction fetcher as recited in claim 2, wherein the replacement information comprises:

a single pointer to indicate which one of the entries of the micro-TLB and the plurality of nano-TLBs is caching the most recently used physical address translation of at least one memory page for the respective one of the plurality of threads.

5. The microprocessor instruction fetcher as recited in claim 2, wherein the replacement information comprises:

a plurality of pointers to indicate which of the entries of the micro-TLB and the plurality of nano-TLBs is caching the most recently used physical address of at least one memory page for the respective one of the plurality of threads.

6. The microprocessor instruction fetcher as recited in claim 2, wherein the replacement information comprises pseudo-most-recently-used information to indicate exactly which one of the entries of the micro-TLB and the plurality of nano-TLBs is caching the most recently used physical address translation of at least one memory page for the respective one of the plurality of threads and to indicate approximately which one or more of the entries of the micro-TLB and the plurality of nano-TLBs is caching next most recently used physical address translations of memory pages for the respective one of the plurality of threads.

7. The microprocessor instruction fetcher as recited in claim 2, further comprising:

selection logic, coupled to the plurality of nano-TLBs, configured to select one of the plurality of nano-TLBs associated with at least one memory page for the respective one of the plurality of threads.

8. The microprocessor instruction fetcher as recited in claim 7, further comprising:

control logic, coupled to the nano-, micro-, and macro-TLBs, wherein if a virtual fetch address misses in both the micro-TLB and the selected nano-TLB, the control logic is configured to evict the physical address translation from one of the micro-TLB entries, and to refill the one of the micro-TLB entries with a physical address translation from the macro-TLB.

9. The microprocessor instruction fetcher as recited in claim 8, wherein if the virtual fetch address misses in both the selected nano-TLB and the micro-TLB, the control logic is configured to copy the evicted physical address translation to the each of the plurality of nano-TLBs whose replacement information indicates the evicted one of the micro-TLB plurality of entries.

10. The microprocessor instruction fetcher as recited in claim 9, wherein for each of the plurality of nano-TLBs to which the control logic copies the evicted information, the control logic is further configured to update the replacement information of the nano-TLB to indicate the evicted information is now being cached in the nano-TLB rather than the micro-TLB.

11. The microprocessor instruction fetcher as recited in claim 8, wherein if the virtual fetch address hits in the micro-TLB, the control logic is configured to update the replacement information of the selected nano-TLB to indicate the hitting one of the micro-TLB entries.

12. The microprocessor instruction fetcher as recited in claim 8, wherein if the virtual fetch address hits in the selected nano-TLB, the control logic is configured to update the replacement information of the selected nano-TLB to indicate an entry in the selected nano-TLB in which the virtual fetch address hits.

13. The microprocessor instruction fetcher as recited in claim 8, wherein if the virtual fetch address misses in the micro-TLB, the respective nano-TLB, and the macro-TLB, the control logic is configured to generate an exception to request system software to refill the one of the micro-TLB entries with a physical address translation.

14. The microprocessor instruction fetcher as recited in claim 8, wherein if the virtual fetch address misses in the micro-TLB, the respective nano-TLB, and the macro-TLB, the control logic is configured to refill the one of the micro-TLB entries with a physical address translation from a page table walk.

15. The microprocessor instruction fetcher as recited in claim 8, wherein the control logic is configured to select the oldest entry of each of the plurality of nano-TLBs for copying the eviction instruction thereto.

16. The microprocessor instruction fetcher as recited in claim 8, wherein the control logic is configured to select for copying to the entry for each of the plurality of nano-TLBs that is next in round-robin order.

17. The microprocessor instruction fetcher as recited in claim 8, wherein the control logic is configured to select for copying to the entry for each of the plurality of nano-TLBs that is least recently used among entries of the plurality of nano-TLBs.

18. The microprocessor instruction fetcher as recited in claim 1, wherein the micro-TLB and the selected nano-TLB are configured to provide the physical address translation in less time than the macro-TLB.

19. The microprocessor instruction fetcher as recited in claim 1, comprising:

a fetch scheduler, configured to select, each clock cycle of a microprocessor clock, a virtual fetch address of one of the plurality of threads for fetching from the instruction cache.

20. The microprocessor instruction fetcher as recited in claim 19, wherein each of the plurality of nano-TLBs is configured to provide the physical address translation in a single cycle of the microprocessor clock.

21. The microprocessor instruction fetcher as recited in claim 19, wherein each of the plurality of nano-TLBs is configured to provide the physical address translation in a fraction of a cycle of the microprocessor clock.

22. A method for translating an instruction cache virtual fetch page address to a physical address using a microprocessor instruction fetcher, the method comprising:

caching virtual-to-physical address translation information in a three-tiered translation lookaside buffer (TLB), the three-tiered TLB including a macro-TLB to cache physical address translations for memory pages for a plurality of threads, a micro-TLB to cache a plurality of translation entries for a subset of the memory pages cached in the macro-TLB, and a plurality of nano-TLBs, each nano-TLB associated with a respective one of the plurality of threads to cache a physical address translation of at least one memory page for the respective one of the plurality of threads;

selecting one of the plurality of nano-TLBs associated with one of the plurality of threads selected to provide a virtual fetch address;

looking up the virtual address in the macro-TLB, micro-TLB, and selected nano-TLB; and providing to the instruction cache a physical address translated from the virtual address provided by one of the macro-, micro-, or selected nano-TLB in which the virtual address hits.

23. The method as recited in claim 22, wherein said looking up the virtual address comprises:

looking up the virtual address in the micro-TLB and in the selected nano-TLB; and looking up the virtual address in the macro-TLB, if the virtual address misses in the micro-TLB and in the selected nano-TLB.

24. The method as recited in claim 22, further comprising:

generating an exception, if the virtual address misses in the macro-TLB, the micro-TLB, and the selected nano-TLB.

25. The method as recited in claim 22, further comprising:

maintaining replacement information for each of the plurality of nano-TLBs, in response to said looking up the virtual address in the TLB system, wherein the replacement information indicates which one or more entries in the micro-TLB and the plurality of nano-TLBs are caching most recently used translation information for the respective one of the plurality of threads.

* * * * *